United States Patent [19]

Mitani

[11] Patent Number: 4,912,070

[45] Date of Patent: Mar. 27, 1990

[54] CONTINUOUSLY POROUS ABSORBENT MATERIAL POSSESSING FAR INFRARED ELECTROMAGNETIC FIELD

[75] Inventor: Yasumasa Mitani, Tokyo, Japan

[73] Assignees: TAC Technology and Science Research Inc.; Yoshio Taguchi, both of Tokyo, Japan

[21] Appl. No.: 227,306

[22] Filed: Aug. 2, 1988

[30] Foreign Application Priority Data

Jan. 29, 1988 [JP] Japan ................................. 63-18940

[51] Int. Cl.⁴ ......................... B01J 37/34; B01J 20/18
[52] U.S. Cl. ........................................... 502/5; 502/60; 252/62.56
[58] Field of Search ....................... 502/60, 66, 84, 5; 252/62.51, 62.56

[56] References Cited

U.S. PATENT DOCUMENTS 3,291,754 12/1966 Hanisch et al. ...................... 502/60
4,565,793 1/1986 Rosensweig ..................... 252/62.56
4,617,282 10/1986 van der Vleugel et al ..... 252/62.51

FOREIGN PATENT DOCUMENTS 146986 12/1978 Japan ..................................... 502/5

Primary Examiner—Carl F. Dees
Attorney, Agent, or Firm—Oblon, Spivak, McClelland, Maier & Neustadt

[57] ABSTRACT

A continuously porous adsorbent material substantially comprising zeolite type clay powder particles, magnetized magnetite particles and ettringite crystals bonding the clay particles and the magnetic particles, wherein the adsorbent material possesses continuous pores comprising relatively large cages connected with one another through smaller channels, the porous material suitable for the purification of various kinds of fluid by adsorption of the impurities contained in the fluid.

12 Claims, No Drawings

CONTINUOUSLY POROUS ABSORBENT MATERIAL POSSESSING FAR INFRARED ELECTROMAGNETIC FIELD

BACKGROUND OF THE INVENTION

The present invention relates to a continuously porous material for the adsorption of microsubstances. More particularly, this invention relates to a continuously porous adsorbent material possessing a far infrared electromagnetic field, which adsorbent material is suitable for the purification of various contaminated fluids, for example, factory wastes, household sewage, river water, exhaust gases and atomospheric air by adsorbing the impurities contained therein such as harmful metal ions, odorous gases, microcolloids, organic solvents, poisonous gas substances and the like.

As an adsorbent for treating various kinds of waste water such as factory wastes and household sewage, activated carbon has been widespreadly put into the practical use. However, activated carbon exhibits poor adsorption efficiency and offers effective adsorption to only limited substances. Further, since the activated carbon is relatively expensive, it cannot be used practically for the treatment of a large volume of waste water. Accordingly, untreated waste water or treated waste water still containing unadsorbed impurities is left flowing into lakes, rivers and oceans and causing the serious problem of the pollution.

Use of an ion-exchange membrane is supposed for the collection of heavy metals from waste water, however, the membrane can hardly be used for this purpose since it is still more expensive than the activated carbon.

When microcolloids are present in waste water, the removal thereof is generally attained by causing precipitation of the microcolloids in the solution by means of a polymer type flocculant which functions as a precipitant. That is, the removal of the microcolloids should be effected as a separate process in addition to the treatment for removal of the impurities other than the microcolloids, and the treatment must rely inevitably on a flloculant liable to cause the secondaly contamination.

SUMMARY OF THE INVENTION

It is therefore an object of the present invention to provide an adsorbent material which is free from the drawbacks suffered by the conventional adsorbent materials for treating waste water described above.

More precisely, the object of the invention is to provide an adsorbent material which permits efficient adsorption of various metal ions and odorous gas substances and the precipitation of microcolloids without additional use of any flocculant, and which is not so expensive as to be utilised in a treatment of waste water in a large volume.

The first aspect of the present invention provides a continuously porous adsorbent material substantially comprising zeolite type clay powder particles, magnetised magnetite particles and ettringite crystals bonding the clay particles and the magnetite particles, wherein the adsorbent material possesses continuous pores comprising relatively large cages connected with one another by means of smaller channels.

The second aspect of the present invention provides a process for the preparation of the continuously porous adsorbent material described above by neutralizing electric charge of zeolite type clay powder, mixing the resultant neutralized clay powder with magnetite, cement, potassium chloride, magnesium chloride, sodium chloride, calcium chloride, sodium sulfate, citric acid, cobalt chloride and water, drying the resultant mixture to form a porous material and magnetizing the porous material.

The third aspect of the present invention provides a composition for use in the preparation of the porous adsorbent material described above, which comprises zeolite type clay powder of which electric charge has been neutralized, magnetite, cement, potassium chloride, magnesium chloride, sodium chloride, calcium chloride, sodium sulfate, citric acid and cobalt chloride.

DESCRIPTION OF THE PREFERRED EMBODIMENTS

The porous adsorbent material according to the invention is characterized in that it is substantially composed of zeolite type clay particles, magnetized magnetite particles and ettringite crystals connecting the clay particles and magnetite particles.

The continuous pores possessed by the porous adsorbent material of the invention are mainly formed as voids present between the ettringite crystals which are bonding the clay particles one another, and comprise relatively large cages and smaller channels interconnecting the cages to form a three-dimentionally reticular structure.

The continuously porous adsorbent material according to the invention, in chemical composition, comprises 40 to 60% by weight of $SiO_2$, 10 to 30% of $Al_2O_3$, 10 to 50% of $Fe_3O_4$, 10 to 30% of $CaO$, 2 to 3% of $MgO$ and 5 to 10% of $Na_2O$, wherein the cages and channels are formed by interconnected polyhedral structures which are made up from those various components mentioned above, in the form of a moleculer or molecular cluster, with cores of $Fe_3O_4$.

The diameters of the cages and channels so formed are approximately in the range of 10 to 5000 Å, and the porous material of the invention has a specific surface area approximately in the range of 20 to 50 m$^2$/g.

The present invention has been accomplished based on the findings that the porous material having such novel specific structure as described above can manifest a high adsorption capasity, that the adsorption capacity of the porous adsorbent can be enhanced by the effect of a far infrared electromagnetic field caused by magnetized magnetite particles contained in the material and that such material is capable of precipitating microcolloids by flocculating them.

The method for the preparation of the porous adsorbent material of the invention will be described below and the formation of the structure of the material will also described precisely.

The continuously porous adsorbent material according to the invention can be prepared by mixing zeolite type clay powder of which electric charge has been neutralized, with magnetite, cement, additives of potassium chloride, magnesium chloride, sodium chloride, calcium chloride, sidium sulfate, citric acid and cobalt chloride and water, drying the resultant mixture to form a porous material and magnetizing the porous material.

The neutralization of the electric charge of the zeolite type clay powder can be carried out by adding to the zeolite type clay powder with 0.04 to 0.05% of ammonium chloride, 0.05 to 0.07% of potassium chloride and 15 to 25% of water based on the weight of the zeolite type clay powder, respectively, then blending them and drying the resultant mixture. When the amount of ammonium chloride to be added is less than 0.04%, it is difficult to neutralize the electric charge of the clay particles sufficiently. When the amount of ammonium chloride exceeds 0.05%, the mechanical strength of the porous material to be obtained is deteriorated. The ammonium chloride thus used also functions to remove humic acid, which inhibits the solidification reaction of the cement, by reacting with the humic acid.

The ettringite crystals bonding the zeolite clay particles are formed mainly from the components contained in the cement and have a chemical composition of $Ca_6Al_{12}(SO_4)_3(OH)_{12}.25H_2O$.

While the mixture of the components is in a liquid phase, the reactivity of calcium ions are enhanced, and the humic acid, which is a macromolecular compound inhibiting the solidification reaction of cement as described above, is removed by the reaction with ammonium chloride, citric acid and sodium sulfate, and thereby the solidification reaction of the cement is promoted.

During the solidification reaction, the calcium ions contained in the cement are imparted with the permeability into the zeolite clay particles by the functions of sodium chloride and potassium chloride to form calcium silicate with the silicate component of the cement. Further, needlelike crystals of ettringite grow to interconnect the particles of zeolite clay powder, and consequently the material solidifies to have numerous voids. As a result, obtained is a continuously porous material described hereinbefore entirely different from well known solidified articles comprising a cement as a solidifying component.

The material of the present invention is a porous solid material composed of magnetite and alminosilicate, wherein the silicon atoms of the $SiO_4$ tetrahedrons sharing the oxygen atoms at the apexes are substituted with aluminium atoms to cause electrification, and the electric charge is neutralized by $Na^+$, $K^+$ and $Ca^{++}$ contained in the material.

Zeolite is a tectoaluminosilicate composed of such components as $SiO_2$, $Al_2O_3$, $CaO$, $Na_2O$, $K_2O$ and the like. For the production of the porous adsorbent material of the present invention, any of commercially available zeolite clay powders can be utilized. The particle size of the zeolite clay powder is not particularly limited in the present invention, however, the particles preferably have diameters of not more than 0.4 mm.

Magnetite particles are added to the material in order to generate a far infrared magnetic field by the magnetization thereof. Any other magnetizable material suitable for the purpose therefore may be used in the present invention, though magnetite is the most preferable magnetizable material from the viewpoint of economy and its availability. When the amount of the magnetite is less than 5% by weight based on the weight of the zeolite clay powder, the material can not have sufficient magnetism. When the amount of magnetite exceeds 50% by weight, the resultant material have insufficient porosity to attain a sufficient capacity of the adsorption. Any commercially available magnetite powder can be used for the present invention, and the particle size of not more than 0.1 mm is preferred.

While any kind of cement capable of forming ettringite crystals can be used for the preparation of the porous adsorbent material according to the invention, portland cement is the most preferable cement material mainly from the economical viewpoint. The amount of the cement is preferably in the range of 5 to 30% by weight based on the weight of the zeolite clay powder.

When the amount of potassium chloride to be used including the portion thereof used during the neutralization of the electric charge of the clay powder is less than 0.07% by weight of the zeolite clay powder, the calcium ion of the cement can not acquire sufficient permeability. When the amount of potassium chloride exceeds 0.095%, the added sodium chloride is not easily dissolved in the mixture and the excess potassium chloride can not further improve the permeability of the calcium ions.

When the amount of sodium chloride is less than 0.015% by weight of the zeolite clay powder, the resultant porous material sustains cracks due to the shrinkage of the material itself. When the amount of sodium chloride exceeds 0.02%, the porous material is apt to swell.

When the amount of sodium chloride is less than 0.015% by weight of the zeolite clay powder, the calcium ions contained in the cement can not acquire sufficient permeability. When the amount of sodium chloride exceeds 0.02%, the added sodium chloride is not easily dissolved in the mixture and the excess sodium chloride can not furter improve the permeability of the calcium ions.

The calcium chloride has an effect for shortening the time for the solidification. When the amount of calcium chloride to be used is less than 0.015% by weight of the zeolite clay powder, the early strength of the porous material can not be obtained. When this amount exceeds 0.02%, the mechanical strength of the resultant porous material is lowered due to the phenomenon of water seepage.

When the amount of sodium sulfate to be contained in the material is less than 0.001% by weight of the zeolite clay powder, the cement can not be quickly hardened. When the amount of sodium sulfate exceeds 0.002%, the stability of mechanical strength during the aging of the resultant porous material become insufficient due to the neutralization of the cement.

The addition of citric acid serves to enhance the solubility of aforementioned inorganic metal salts in water. When the amount of citric acid is less than 0.0005% by weight of the zeolite clay powder, it becomes difficult to dissolve those metal salts mentioned above in the mixture. When the amount of citric acid exceeds 0.001%, the mechanical strength of the resultant porous material becomes insufficient.

The incorporation of cobalt chloride serves to accelerate the reactions mentioned above and promote orderly arrangement of the bonds between the particles. When the amount of cobalt chloride contained in the material is less than 0.0001% by weight of the zeolite clay powder, the sufficient reactivity of the each component in the ionic form can not be obtained. When the amount of cobalt chloride exceeds 0.0002%, the effect can not be further enhanced and the excess cobalt chloride proves to be wasteful.

The blending of all these components can be carried out by a conventional technique. A modified fluidizing mixer, for example, can blend the components and granulate the mixture successively. Generally, the blending operation of about 3 minutes is enough to convert the components into granules approximately 2 mm in diameter. The granules in such size are suitable as a finished product, while the size of the product is not particularly limited. The blending temperature is not particularly limited with proviso that it should be effected at a temperature below 80° C. because the mixture contains the cement.

The drying of the resultant granules is preferably carried out by the steam drying process in order to accelerate the solidification of the cement. The solodification temperature should be also below 80° C. because of the same reason described above. It was found that the sufficient quality of the product can be obtained by a drying operation effected to an extent approximately in the range of 4000 to 5000 degree.hours in terms of the drying temperature and the drying period (for example, a drying process during 10 days at 20° C. is caluculated as 20° C.×24 hours×10=4800 degree.hours).

The magnetization can be effected by a conventional magnetizer, and it must be performed either after the granulated mixture has been dried into the porous material or after it has been partially dried when the granulated material aquires a relatively stable porous texture. From the viewpoint of the industrial production, the granulated material is advantageously magnetized during the drying process, and in this case the magnetization is preferably effected after the granules are subjected to the drying process of about 400 to 500 degree.-hours.

The coninuously porous adsorbent material of the invention which possesses a far infrared electromagnetic field has a porous texture containing micropores (channels) and macropores (cages). Therefore, it permits smooth flow of liquid and gas therethrough and has a high specific surface area due to the numerous voids contained therein. Further, the porous adsorbent material stores cations therein by adsorbing them electrically.

When odorous molecules, gaseous molecules and the like come into contact with the porous adsorbent material possessing a far infrared electromagnetic field according to the invention, they are physically adsorbed on the surface of the porous structure. Various metal ions are either exchanged with the ions which have electrically stored in the numerous micropores or macropores of the material or adsorbed physically on the surface of the microstructure.

Owing to such ion-exchangeabllity of the material, the water brought into contact with the material is demineralized, i.e., the dissolving capacity of the water is improved, and thereby the fluidity thereof is enhanced to contribute to the improvement of the adsorption ability of the material. Further, the magnetic field also contributes to the flocculation of the microcolloids dissolved in the water to precipitate them rapidly. Thus, the porous adsorbent material of the present invention can purify various kinds of waste water lastingly.

The mechanism of the effect of the electromagnetic field on a liquid containing impurities is supposed as follows. The particles contained in waste water including water molecules, hydrated ions and microparticles of the impurities are always irregularly migrating due to the energy possessed by each of the particles. When the particles are placed under the infuluence of an electromagnetic field of an optimum frequency, the chemical or physical bonds exsisting in the particles may be deformed to change the structural characteristics of the particles, and thereby the particles become to able to cause a resonance due to the generation of energy. As regards the effect of the magnetic field on the nature of water molecules, the electromagnetic field alters the atomic valence angle of the water molecules, i.e., enhances the dipole moment of the molecules and alter the intermolecular action of the molecules to contribute to the flocculation of the colloid particles.

Further, the magnetization of the solution under the influence of the magnetic field may alter the distribution of the molecules existing in the solution, and thereby the chemical kinetics in the solution may be influenced, that is, the electomagnetic field can alter the structures of the water molecules and enhance the hydration capacity of the particles contained in the solution.

The adsorbent material of the present invention also has the other advantages that it can be easily produced merely by mixing the zeolite type clay powder with magnetite, cement and various additives dissolved in a solution, drying the resultant mixture and magnetizing the dried mixture and that the material may be provided very cheaply because the production process is rather simple and because all of the raw materials are not so expensive.

The composition according to the invention, which is suitable for use in the preparation of the continuously porous adsorbent material, comprises zeolite clay powder of which electric charge has been neutralized, magnetite powder, cement, potassium chloride, magnesium chloride, sodium chloride, calcium chloride, sodium sulfate, citric acid and cobalt chloride.

The composition can be prepared by mixing all of the ingredients mentioned above, and it can be conveniently converted into the adsorbent material of the invention by mixing it with an appropriate amount of water, drying the obtained mixture to form a porous material and then magnetizing the porous material. The composition preferably comprises each component in the weight ratio indicated below (in parts by weight).

| Charge-neutralized zeolite clay powder | 100 |
| --- | --- |
| Cement | 5 to 30 |
| Magnetite | 5 to 50 |
| Potassium chloride | 0.02 to 0.025 |
| Magnesium chloride | 0.015 to 0.02 |
| Sodium chloride | 0.015 to 0.02 |
| Calcium chloride | 0.015 to 0.02 |
| Sodium sulfate | 0.001 to 0.002 |
| Citric acid | 0.0005 to 0.0001 |
| Cobalt chloride | 0.0001 to 0.0002 |

EXAMPLES

The present invention now described with reference to working examples illustrated below. The following examples are included merely to aid in the understanding of the invention, and variations may be made by one skilled in the art without departing from the scope of the invention.

Example 1

A commercially available zeolite type clay powder (Tamalite, Okutama Kogyo Co., Ltd.) is added with 16% by weight, based on the weight of the clay powder, of an aqueous solution of 0.045% by weight of ammonium chloride and 0.06% by weight of potassium chloride, mixed and dried to neutralize the electric charge of the clay powder.

The physical characteristics of the zeolite clay powder used herein are as follows;

| Particle size distribution (%) | |
| --- | --- |
| 0.42 mm to 2 mm | 5 |

| Particle size distribution (%) | |
| --- | --- |
| 0.074 mm to 0.42 mm | 67 |
| 0.005 mm to 0.074 mm | 18 |
| Below 0.005 mm | 10 |
| Particle specific gravity, GS | 2.73 |
| Wet density, Pt (g/cm$^3$) | 1.606 |
| Dry Density, Pd (g/cm$^3$) | 1.333 |
| Void ratio, e | 1.048 |
| Humidity, Sr (%) | 53.3 |
| Constency characteristics | |
| Liquid limit, WL (%) | 38.7 |
| Plastic limit, WP (%) | 25.3 |
| Plasticity index, IP | 13.4 |

The following amounts of the components indicated below were mixed and granulated in a modified fluidizing mixer (Omni-Mixer, Chiyoda kogyo Co., Ltd.) for 5 minutes. As zeolite clay powder, the charge-neutralized zeolite clay powder described above was used.

| | |
| --- | --- |
| Zeolite clay powder | 1000 kg |
| Portland cement (Nihon Cement Co., Ltd) | 200 kg |
| Magnetite (Ferrite, Dowa Kogya Co., Ltd.) | 100 kg |
| Potassium chloride | 0.7 kg |
| Ammonium chloride | 0.5 kg |
| Magnesium chloride | 0.2 kg |
| Sodium chloride | 0.2 kg |
| Calcium chloride | 0.17 kg |
| Sodium sulfate | 0.015 kg |
| Citric acid | 0.007 kg |
| Cobalt chloride | 0.001 kg |
| water | 160 kg |

The components other than zeolite clay powder, cement and magnetite were prepared in the form of an aqueous solution in advance.

The granules consequently obtained were dried at 80° C. for 62 hours while supplying with steam. During the drying process, 35 hours later from the start of the drying, the granules were magnetized for 4 seconds under the conditions of a magnetizing current of 6A and a magnetic field of 40 G by means of a conventional magnetizer (a pot-shaped electromagnet produced by Denshijiki Kogyo Co., Ltd.).

Consequently, granules of the porous adsorbent material having an average diameter of about 5 mm were obtained, of which characteristics were as follows.

| | |
| --- | --- |
| Specific gravity | 1.2 |
| Absolute specific gravity | 2.7 |
| Specific surface area | 30 m$^2$/g |
| Chemical composition | |
| SiO$_2$ | 45 (%) |
| Al$_2$O$_3$ | 30 |
| Fe$_3$O$_4$ | 15 |
| CaO | 3 |
| MgO | 0.5 |
| Insoluble residue | 6.5 |

Example 2

Granules of the continuously porous adsorbent material of the invention were obtained by repeating the procedure of Example 1, excepting that the following formulating ratio was used.

| | |
| --- | --- |
| Charge-neutralized zeolite clay powder | 1000 kg |
| Portland cement (Nihon Cement Co., Ltd) | 250 kg |
| Magnetite (Ferrite, Dowa Kogyo Co., Ltd.) | 110 kg |
| Potassium chloride | 0.8 kg |
| Ammonium chloride | 0.5 kg |
| Magnesium chloride | 0.3 kg |
| Sodium chloride | 0.3 kg |
| Calcium chloride | 0.19 kg |
| Sodium sulfate | 0.017 kg |
| Citric acid | 0.008 kg |
| Cobalt chloride | 0.0012 kg |
| water | 185 kg |

Example 3

The adsorption ability of the continuously porous adsorbent material obtained in Examples 1 and 2 was tested concerning with a gaseous substance and a heavy metal by means of a column adsorption tester.

The results of the tests are shown below.

Gaseous Substance

| | |
| --- | --- |
| Substance to be adsorbed | CH$_3$(CH$_2$)$_2$COOH (butyric acid) |
| Amount of adsorbent | 1 liter |
| Gas flow rate | SV = 1000 hr$^{-1}$ |
| Temperature | 20° C. |
| Adsorption capacity | Example 1: 240 g/liter (adsorbent) |
| | Example 2: 210 g/liter (adsorbent) |

Heavy Metal

| | |
| --- | --- |
| Heavy metal to be adsorbed | Pb (lead) |
| Ion concentration | 50 ppm |
| Water flow rate | SV = 25 hr$^{-1}$ |
| Amount of adsorbent | 1 liter |
| Temperature | 20° C. |
| Adsorption capacity | Example 1: 36 g/liter (adsorbent) |
| | Example 2: 20 g/liter (adsorbent) |

The results clearly show the fact that the continuously porous adsorbent materials of the invention are excellent adsorbent material for the gaseous substance and the heavy metal.

Example 4

The continuously porous adsorbent material of the present invention obtained in Example 1 and a commercially available high grade activated carbon having a specific surface area of 1800 m$^2$/g were tested for the adsorption capacity thereof by the same method as used in Example 3 with the exception that the amount of the adsorbent filled in the column was 20 g.

The experimental conditions and the results are shown below.

| Substance to be absorbed | Concentration (ppm) | Gas flow rate (ml/sec) | Adsorption capacity* (g/kg) | |
| --- | --- | --- | --- | --- |
| | | | Porous material of the invention | Activated carbon |
| Hydrogen sulfide | 1100 | 3.8 | 8.3 | 4.1 |
| | 1200 | 7.6 | 6.5 | 3.3 |
| Butyric acid | 130 | 3.8 | 240 | 28 |

-continued

| Substance to be absorbed | Concentration (ppm) | Gas flow rate (ml/sec) | Adsorption capacity* (g/kg) | |
|---|---|---|---|---|
| | | | Porous material of the invention | Activated carbon |
| | | 7.6 | 210 | 21 |

*The adsorption capacity was determined at the point where the concentration of the substance to be absorbed in the gas decreased to 1/10 of the original level.

From the results given above, it is clearly noted that the porous adsorbent material of the present invention possesses a significantly higher adsorption capacity than the high grade activated carbon.

What is claimed is:

1. A continuousLy porous adsorbent material substantially comprising zeolite clay powder particles, magnetised magnetite particles and ettringite crystals bonding the clay particles and the magnetite particles, wherein the adsorbent material possesses continuous pores comprising relatively large cages connected with one another through smaller channels.

2. The continuously porous adsorbent material according to claim 1, wherein the porous material has the following composition:

| $SiO_2$ | 40 to 60% (by weight) |
|---|---|
| $Al_2O_3$ | 10 to 30% |
| $Fe_3O_4$ | 10 to 50% |
| CaO | 10 to 30% |
| MgO | 2 to 3% |
| $Na_2O$ | 5 to 10%. |

3. The continuously porous adsorbent material according to claim 1, wherein the diameters of the cages and channels are in the range of about 10 to 5000 Å.

4. The continuously porous adsorbent material according to claim 1, wherein the specific surface area of the porous material is in the range of about 20 to 50 $m^2/g$.

5. A process for the preparation of the continuously porous absorbent material according to claim 1, which comprises:
   (a) electrically neutralizing zeolite clay powder,
   (b) mixing the resultant zeolite clay powder with magnetite, cement, potassium chloride, magnesium chloride, sodium chloride, calcium chloride, sodium sulfate, citric acid, cobalt chloride and water,
   (c) drying the resultant mixture to form a porous material and
   (d) magnetizing the porous material.

6. The process according to claim 5, wherein the clay powder is electrically neutralized by mixing the powder with an aqueous solution of ammonium chloride and potassium chloride and drying the resultant mixture.

7. The process according to claim 5, wherein the ingredients are mixed in the following weight ratio based on the weight of the zeolite clay powder:

| Cement | 5 to 30% (by weight) |
|---|---|
| Magnetite | 5 to 50% |
| Potassium chloride | 0.02 to 0.025% |
| Magnesium chloride | 0.015 to 0.02% |
| Sodium chloride | 0.015 to 0.02% |
| Calcium chloride | 0.015 to 0.02% |
| Sodium sulfate | 0.001 to 0.002% |
| Citric acid | 0.0005 to 0.001% |
| Cobalt chloride | 0.0001 to 0.002% |
| Water | 15 to 25% |

8. A composition for the preparation of the continuously porous absorbent material according to claim 1, which comprises an electrically neutral zeolite clay powder, magnetite powder, potassium chloride, magnesium chloride, sodium chloride, calcium chloride, sodium sulfate, citric acid and cobalt chloride.

9. The composition according to claim 8, wherein the composition has the following formulating ratio:

| Charge-neutralized zeolite clay powder | 100 (parts by weight) |
|---|---|
| Cement | 5 to 30 |
| Magnetite | 5 to 50 |
| Potassium chloride | 0.02 to 0.025 |
| Magnesium chloride | 0.015 to 0.02 |
| Sodium chloride | 0.015 to 0.02 |
| Calcium chloride | 0.015 to 0.02 |
| Sodium sulfate | 0.001 to 0.002 |
| Citric acid | 0.0005 to 0.001 |
| Cobalt chloride | 0.0001 to 0.0002 |

10. The process according to claim 6, wherein the clay powder is electrically neutralized by adding to the clay powder about 0.04 to 0.05% of ammonium chloride, 0.05 to 0.07% of potassium chloride and 15 to 25% of water based on the weight of the clay powder.

11. The process according to claim 5, wherein the zeolite clay powder contains particles having a diameter of not more than about 0.4 mm.

12. The process according to claim 5, wherein said magnetite contains particles having a diameter of not more than about 0.1 mm.

* * * * *